US010975479B2

(12) United States Patent
Fritz et al.

(10) Patent No.: US 10,975,479 B2
(45) Date of Patent: Apr. 13, 2021

(54) ELECTROLYTIC CELLS AND WATER TREATMENT SYSTEMS CONTAINING THE SAME

(71) Applicant: USGI Solutions, Inc., Poway, CA (US)

(72) Inventors: Billie Fritz, Fremont, CA (US); Gary Turner, Los Gatos, CA (US); Mark Kushman, San Francisco, CA (US); Chris Levash, San Rafael, CA (US)

(73) Assignee: UGSI Solutions, Inc., Poway, CA (US)

( * ) Notice: Subject to any disclaimer, the term of this patent is extended or adjusted under 35 U.S.C. 154(b) by 75 days.

(21) Appl. No.: 16/295,778

(22) Filed: Mar. 7, 2019

(65) Prior Publication Data

US 2019/0276942 A1 Sep. 12, 2019

Related U.S. Application Data

(60) Provisional application No. 62/640,227, filed on Mar. 8, 2018.

(51) Int. Cl.
*C25B 9/06* (2006.01)
*C25B 1/26* (2006.01)
(Continued)

(52) U.S. Cl.
CPC .............. *C25B 9/063* (2013.01); *C25B 1/26* (2013.01); *C25B 9/02* (2013.01); *C25B 9/04* (2013.01);
(Continued)

(58) Field of Classification Search
None
See application file for complete search history.

(56) References Cited

U.S. PATENT DOCUMENTS 3,893,902 A * 7/1975 Loftfield ............... C02F 1/4674
205/350
4,203,821 A * 5/1980 Cramer .................... C25B 3/02
204/268
(Continued)

FOREIGN PATENT DOCUMENTS

DE 10015209 A1 * 10/2001 .......... C02F 1/46104

OTHER PUBLICATIONS

Wiseman, George, "NEWest News About Brown's Gas", Oct. 1999, original URL: http://eagle-research.com/browngas/watergas.html, date evidence shown from Archive.org at http://web.archive.org/web/19991013103636/http://eagle-research.com/browngas/watergas.htmlrl (Year: 1999).*

*Primary Examiner* — Harry D Wilkins, III
(74) *Attorney, Agent, or Firm* — The Webb Law Firm (57) ABSTRACT

An electrolytic cell includes: a cartridge assembly including: a plurality of bipolar electrode plates spaced apart and guide members formed on both sides of the plurality of bipolar electrode plates; a cell body having: a first side; a second side opposite the first side; an opening that extends through the first and second sides to form a housing that receives the cartridge assembly; a first end having an inlet that allows liquid to enter the housing of the cell body and a second end having an outlet that allows liquid to exit the housing of the cell body; a first terminal cap that connects to the first side of the cell body and which has a cathode plate; and a second terminal cap that connects to the second side of the cell body and which has an anode plate.

19 Claims, 4 Drawing Sheets

(51) Int. Cl.
  *C25B 9/02*  (2006.01)
  *C25B 9/04*  (2006.01)
  *C02F 1/461*  (2006.01)
  *C02F 101/12*  (2006.01)

(52) U.S. Cl.
  CPC .. *C02F 1/46109* (2013.01); *C02F 2001/4619* (2013.01); *C02F 2001/46128* (2013.01); *C02F 2001/46152* (2013.01); *C02F 2101/12* (2013.01); *C02F 2201/46105* (2013.01)

(56) References Cited

U.S. PATENT DOCUMENTS

| | | | | |
|---|---|---|---|---|
| 4,992,156 A * | 2/1991 | Silveri | ............... | C02F 1/46104 204/229.5 |
| 5,183,545 A * | 2/1993 | Branca | ............... | C08J 5/2281 204/252 |
| 5,989,396 A * | 11/1999 | Prasnikar | ............... | B01D 19/0068 204/252 |
| 6,233,135 B1 * | 5/2001 | Farahmandi | ............... | H01G 9/038 361/502 |
| 6,663,783 B2 * | 12/2003 | Stephenson | ............... | C02F 1/463 204/242 |
| 7,897,022 B2 | 3/2011 | Simmons et al. | | |
| 2001/0048964 A1 * | 12/2001 | Gopal | ............... | A23D 9/00 426/601 |
| 2007/0007145 A1 * | 1/2007 | Simmons | ............... | C02F 1/4674 205/357 |
| 2009/0248093 A1 * | 10/2009 | Waytashek | ............... | H01G 9/15 607/2 |
| 2010/0276296 A1 * | 11/2010 | Arnett | ............... | C25B 1/06 205/337 |
| 2011/0048964 A1 | 3/2011 | Luebke et al. | | |
| 2011/0240539 A1 * | 10/2011 | Nose | ............... | B01F 3/04241 210/192 |
| 2014/0021040 A1 * | 1/2014 | Matsuyama | ............... | C02F 1/46104 204/242 |
| 2014/0054166 A1 * | 2/2014 | Brandon | ............... | C02F 1/46104 204/275.1 |
| 2014/0224647 A1 * | 8/2014 | Grimm | ............... | C25B 9/063 204/242 |
| 2015/0299008 A1 * | 10/2015 | Simmons | ............... | C25B 1/26 210/739 |

* cited by examiner

ELECTROLYTIC CELLS AND WATER TREATMENT SYSTEMS CONTAINING THE SAME

CROSS REFERENCE TO RELATED APPLICATIONS

This application claims priority to U.S. Provisional Application No. 62/640,227 filed Mar. 8, 2018, which is incorporated herein by reference in its entirety.

BACKGROUND OF THE INVENTION

Field of the Invention

The present invention is generally directed to electrolytic cells and water treatment systems containing such electrolytic cells.

Description of Related Art

Water utilities add disinfectants to water systems to prevent contamination from germs and bacteria. While chlorine is the most common secondary disinfectant, many water utilities are turning to chloramines, such as sodium hypochlorite, as the main secondary disinfectant. These hypochlorites are typically prepared on site to avoid issues associated with transportation and storage. For instance, sodium hypochlorite is commonly prepared by liberating hydrogen from a base solution on site using electrolytic cells. However, despite the benefits of providing on site disinfectants, current electrolytic cells have various drawbacks, such as plate degradation, leakage, and high costs for replacing and/or repairing each cell. Thus, it is desirable to provide electrolytic cells that overcome or address these drawbacks.

SUMMARY OF THE INVENTION

In certain non-limiting embodiments or aspects, provided is an electrolytic cell comprising: a cartridge assembly comprising: a plurality of bipolar electrode plates spaced apart; guide members formed on both sides of the plurality of bipolar electrode plates; a cell body comprising: a first side; a second side opposite the first side; an opening that extends through the first and second sides to form a housing that receives the cartridge assembly; a first end comprising an inlet that allows liquid to enter the housing of the cell body; and a second end comprising an outlet that allows liquid to exit the housing of the cell body; a first terminal cap that connects to the first side of the cell body and which comprises a cathode plate; and a second terminal cap that connects to the second side of the cell body and which comprises an anode plate. The first and second terminal caps close the opening of the cell body and enclose the cartridge assembly within the housing of the cell body.

In some non-limiting embodiments or aspects, the guide members are spaced apart, and each guide member independently extends in a direction perpendicular to a longitudinal axis of the bipolar electrode plates. In certain non-limiting embodiments or aspects, the housing of the cell body comprises recesses that receive the guide members of the cartridge assembly. The guide members can be formed from various materials such as polytetrafluoroethylene, for example.

In some non-limiting embodiments or aspects, the cartridge assembly further comprises side members that attach to the sides of the plurality of bipolar electrode plates. In certain non-limiting embodiments or aspects, the side members comprise grooves that receive a portion of the sides of the plurality of bipolar electrode plates. The side members can also comprise recesses that receive the guide members of the cartridge assembly.

In certain non-limiting embodiments or aspects, a notch is formed in a corner of each bipolar electrode plate, and the housing of the cell body is configured to receive the notches of the bipolar electrode plates and prevent incorrect installation of the cartridge assembly into the housing of the cell body. In some non-limiting embodiments or aspects, a first notch is formed in a corner of a first end of each bipolar electrode plate and a second notch is formed in a corner of a second opposite end of each bipolar electrode plate, and the housing of the cell body is configured to receive the first and second notches of the bipolar electrode plates and prevent incorrect installation of the cartridge assembly into the housing of the cell body.

In certain non-limiting embodiments or aspects, the inner surface of the first terminal cap comprises a recess that is configured to receive the cathode plate and an inner surface of the second terminal cap comprises a recess that is configured to receive the anode plate. The cathode plate can comprise a notched corner and the recess of the first terminal cap can be configured to receive the notched corner of the cathode plate. The anode plate may comprise a notched corner that is different from the notched corner of the cathode plate, and the recess of the second terminal cap may be configured to receive the notched corner of the anode plate.

In some non-limiting embodiments or aspects, the first and second terminal caps each independently comprise orifices positioned around a perimeter of each cap and which are configured to receive fasteners to attach the caps to the cell body. The orifices of the first terminal cap can form a first pattern that align with orifices formed in the first side of the cell body, and the orifices of the second terminal cap can form a second pattern that is different from the first pattern and which align with orifices formed in the second side of the cell body.

In certain non-limiting embodiments or aspects, the cell body is formed from a transparent material to allow the bipolar electrode plates of the cartridge assembly to be viewed through the cell body.

In certain non-limiting embodiments or aspects, provided is a system for treating water comprising: a plurality of electrolytic cells in fluid communication with each other, each electrolytic cell comprising any of the cells previously described and a vessel comprising a base solution in fluid communication with at least one of the electrolytic cells. In certain non-limiting embodiments or aspects, hydrogen is liberated from the base solution to form sodium hypochlorite after the base solution is passed through the electrolytic cells.

In certain non-limiting embodiments or aspects, provided is a method of liberating hydrogen from a base solution comprising: directing a base solution into an electrolytic cell, the electrolytic cell comprising any of the previously described electrolytic cells; passing the base solution through the plurality of bipolar electrode plates; supplying current to the cathode and anode plates and charging the bipolar electrode plates as the base solution passes through the bipolar electrode plates; and liberating hydrogen from the base solution to form sodium hypochlorite.

Further non-limiting embodiments or aspects are set forth in the following numbered clauses:

Clause 1: An electrolytic cell comprising: a cartridge assembly comprising: a plurality of bipolar electrode plates spaced apart and guide members formed on both sides of the plurality of bipolar electrode plates; a cell body comprising: a first side; a second side opposite the first side; an opening that extends through the first and second sides to form a housing that receives the cartridge assembly; a first end comprising an inlet that allows liquid to enter the housing of the cell body and a second end comprising an outlet that allows liquid to exit the housing of the cell body; a first terminal cap that connects to the first side of the cell body and which comprises a cathode plate; and a second terminal cap that connects to the second side of the cell body and which comprises an anode plate, wherein the first and second terminal caps close the opening of the cell body and enclose the cartridge assembly within the housing of the cell body.

Clause 2: The electrolytic cell of clause 1, wherein the guide members are spaced apart, and wherein each guide member independently extends in a direction perpendicular to a longitudinal axis of the bipolar electrode plates.

Clause 3: The electrolytic cell of clauses 1 or 2, wherein the guide members are formed from polytetrafluoroethylene.

Clause 4: The electrolytic cell of any of clauses 1-3, wherein the housing of the cell body comprises recesses that receive the guide members of the cartridge assembly.

Clause 5: The electrolytic cell of any of clauses 1-4, wherein a notch is formed in a corner of each bipolar electrode plate, and wherein the housing of the cell body is configured to receive the notches of the bipolar electrode plates and prevent incorrect installation of the cartridge assembly into the housing of the cell body.

Clause 6: The electrolytic cell of any of clauses 1-4, wherein a first notch is formed in a corner of a first end of each bipolar electrode plate and a second notch is formed in a corner of a second opposite end of each bipolar electrode plate, and wherein the housing of the cell body is configured to receive the first and second notches of the bipolar electrode plates and prevent incorrect installation of the cartridge assembly into the housing of the cell body.

Clause 7: The electrolytic cell of any of clauses 1-3, wherein the cartridge assembly further comprises side members that attach to the sides of the plurality of bipolar electrode plates.

Clause 8: The electrolytic cell of clause 7, wherein the side members comprise grooves that receive a portion of the sides of the plurality of bipolar electrode plates.

Clause 9: The electrolytic cell of any one of clause 7-9, wherein the side members comprise recesses that receive the guide members of the cartridge assembly.

Clause 10: The electrolytic cell of any of clauses 1-9, wherein an inner surface of the first terminal cap comprises a recess that is configured to receive the cathode plate and an inner surface of the second terminal cap comprises a recess that is configured to receive the anode plate.

Clause 11: The electrolytic cell of any of clauses 1-10, wherein the cathode plate comprises a notched corner and the recess of the first terminal cap is configured to receive the notched corner of the cathode plate.

Clause 12: The electrolytic cell of any of clauses 1-11, wherein the anode plate comprises a notched corner that is different from the notched corner of the cathode plate and the recess of the second terminal cap is configured to receive the notched corner of the anode plate.

Clause 13: The electrolytic cell of any of clauses 1-12, wherein the first and second terminal caps each independently comprise orifices positioned around a perimeter of each cap and which are configured to receive fasteners to attach the caps to the cell body.

Clause 14: The electrolytic cell of any of clauses 1-13, wherein the orifices of the first terminal cap form a first pattern that align with orifices formed in the first side of the cell body, and the orifices of the second terminal cap form a second pattern that is different from the first pattern and which align with orifices formed in the second side of the cell body.

Clause 15: The electrolytic cell of any of clauses 1-14, wherein the cell body is formed from a transparent material to allow the bipolar electrode plates of the cartridge assembly to be viewed through the cell body.

Clause 16: A system for treating water comprising: a plurality of electrolytic cells in fluid communication with each other, each electrolytic cell comprising: a cartridge assembly comprising: a plurality of bipolar electrode plates spaced apart and guide members formed on both sides of the plurality of bipolar electrode plates; a cell body comprising: a first side; a second side opposite the first side; an opening that extends through the first and second sides to form a housing that receives the cartridge assembly; a first end comprising an inlet that allows liquid to enter the housing of the cell body and a second end comprising an outlet that allows liquid to exit the housing of the cell body; a first terminal cap that connects to the first side of the cell body and which comprises a cathode plate; and a second terminal cap that connects to the second side of the cell body and which comprises an anode plate, wherein the first and second terminal caps close the opening of the cell body and enclose the cartridge assembly within the housing of the cell body.

Clause 17: The system of clause 16, wherein hydrogen is liberated from the base solution to form sodium hypochlorite after the base solution is passed through the electrolytic cells.

Clause 18: The system of clauses 16 or 17, wherein the guide members are spaced apart, and wherein each guide member independently extends in a direction perpendicular to a longitudinal axis of the bipolar electrode plates.

Clause 19: The system of any of clauses 16-18, wherein the housing of the cell body comprises recesses that receive the guide members of the cartridge assembly.

Clause 20: The system of any of clauses 16-19, wherein a notch is formed in a corner of each bipolar electrode plate, and wherein the housing of the cell body is configured to receive the notches of the bipolar electrode plates and prevent incorrect installation of the cartridge assembly into the housing of the cell body.

Clause 21: The system of any of clauses 16-20, wherein a first notch is formed in a corner of a first end of each bipolar electrode plate and a second notch is formed in a corner of a second opposite end of each bipolar electrode plate, and wherein the housing of the cell body is configured to receive the first and second notches of the bipolar electrode plates and prevent incorrect installation of the cartridge assembly into the housing of the cell body.

Clause 22: The system of any of clauses 16-21, wherein an inner surface of the first terminal cap comprises a recess that is configured to receive the cathode plate and an inner surface of the second terminal cap comprises a recess that is configured to receive the anode plate.

Clause 23: The system of any of clauses 16-18 and 21-22, wherein the cartridge assembly further comprises side members that attach to the sides of the plurality of bipolar electrode plates.

Clause 24: The system of clause 23, wherein the side members comprise grooves that receive a portion of the sides of the plurality of bipolar electrode plates.

Clause 25: The system of clause 24, wherein the side members comprise recesses that receive the guide members of the cartridge assembly.

Clause 26: A method of liberating hydrogen from a base solution comprising: (a) directing a base solution into an electrolytic cell, the electrolytic cell comprising: a cartridge assembly comprising: a plurality of bipolar electrode plates spaced apart and guide members formed on both sides of the plurality of bipolar electrode plates; a cell body comprising: a first side; a second side opposite the first side; an opening that extends through the first and second sides to form a housing that receives the cartridge assembly; a first end comprising an inlet that allows liquid to enter the housing of the cell body and a second end comprising an outlet that allows liquid to exit the housing of the cell body; a first terminal cap that connects to the first side of the cell body and which comprises a cathode plate; and a second terminal cap that connects to the second side of the cell body and which comprises an anode plate, wherein the first and second terminal caps close the opening of the cell body and enclose the cartridge assembly within the housing of the cell body; (b) passing the base solution through the plurality of bipolar electrode plates; (c) supplying current to the cathode and anode plates and charging the bipolar electrode plates as the base solution passes through the bipolar electrode plates; and (d) liberating hydrogen from the base solution to form sodium hypochlorite.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, the terms "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 1:
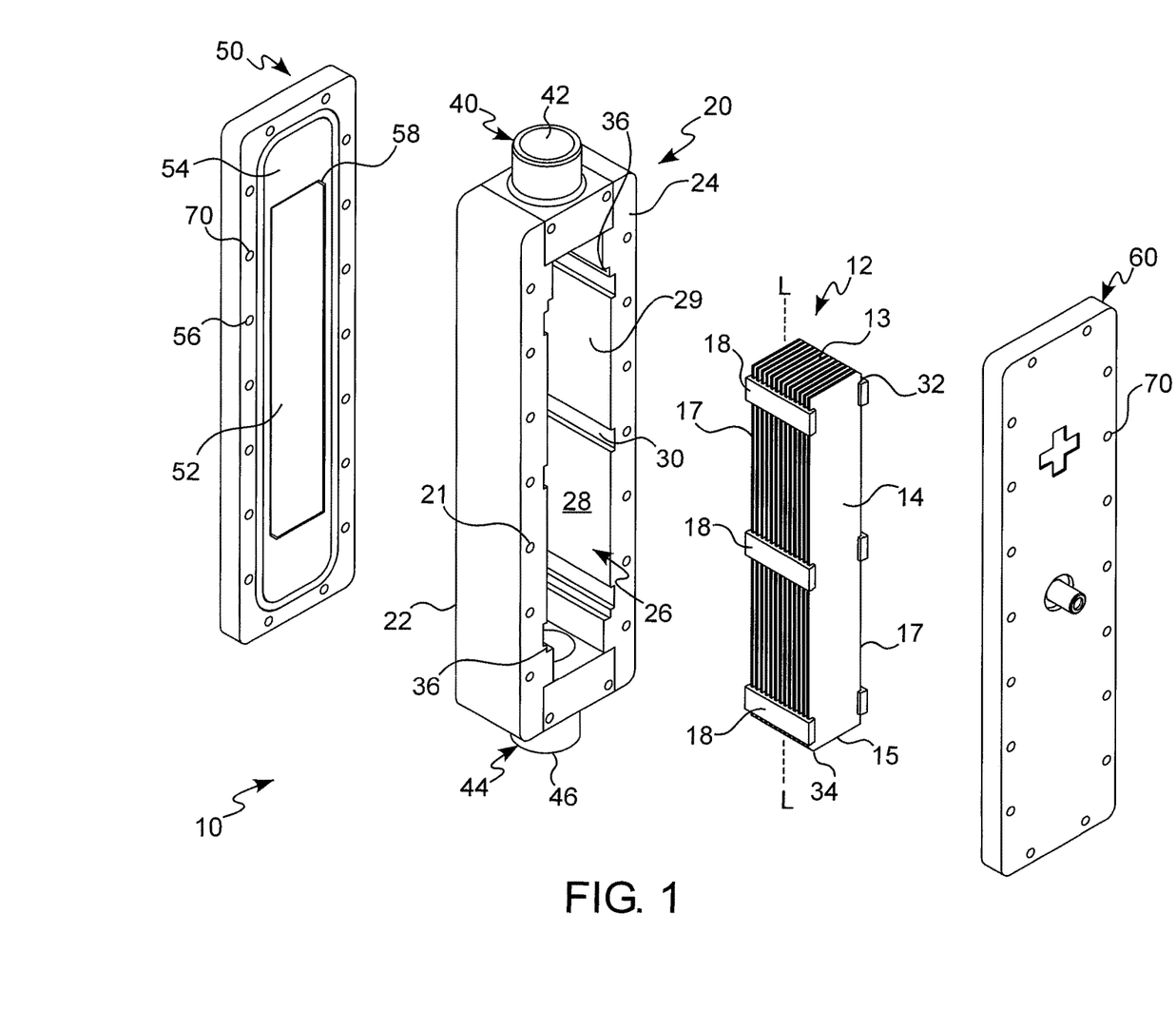
FIG. 1 is a perspective cutaway view of an electrolytic cell according to a first embodiment of the present invention.

Referring to FIG. 1, and in a non-limiting embodiment or aspect, the present invention relates to an electrolytic cell 10. As shown in FIG. 1, the electrolytic cell 10 includes a cartridge assembly 12 comprising a plurality of bipolar electrode plates 14 that are spaced apart from each other. The spaces between the bipolar electrode plates 14 form compartments through which a liquid, such as a base solution, passes. The bipolar electrode plates 14 of the cartridge assembly 12 are held together by guide members 18 that extend down both sides 17 of the bipolar electrode plates 14. To secure the bipolar electrode plates 14 in place, the guide members 18 can include grooves that engage a portion of the sides 17 of the bipolar electrode plates 14. As shown in FIG. 1, each guide member 18 independently extends in a direction perpendicular to a longitudinal axis (reference letter "L") of the bipolar electrode plates 14. Further, each of the guide members 18 are spaced apart along the sides 17 of the bipolar electrode plates 14 such that a portion of the sides 17 of the bipolar electrode plates 14 can be seen after the guide members 18 are attached thereto. The guide members 18 can be formed from various materials including, but not limited to, polytetrafluoroethylene.

Referring again to FIG. 1, the electrolytic cell 10 also includes a cell body 20. The cell body 20 comprises a first side 22, a second side opposite the first side 24, and an opening 26 that extends through the first 22 and second sides 24 to form a housing 28 that is configured to receive the cartridge assembly 12.

In certain non-limiting embodiments or aspects, to secure the cartridge assembly 12 within the housing 28 of the cell body 20, the housing 28 can include recesses 30 that receive the guide members 18 of the cartridge assembly 12. For example, recesses 30 can be formed on the inner surface 29 of the housing 28 to receive the shape and design of the guide members 18 when the cartridge assembly 12 is placed into the cell body 20 to lock the cartridge assembly 12 within the housing 28.

Figure 2:
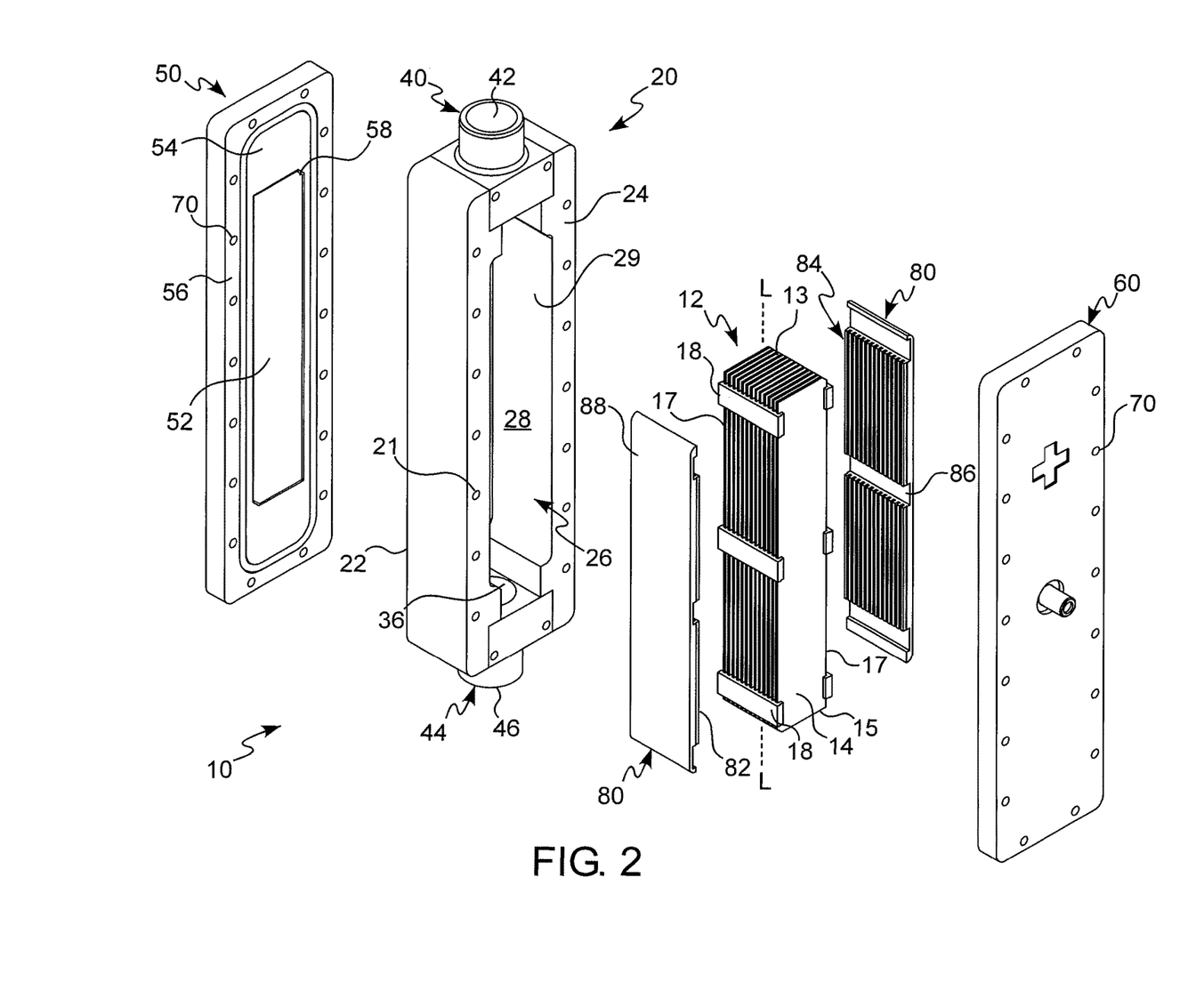
FIG. 2 is a perspective cutaway view of an electrolytic cell according to a second embodiment of the present invention.

In some non-limiting embodiments or aspects, referring to FIG. 2, the cartridge assembly 12 further comprises side members 80 that attach to the sides 17 of the bipolar electrode plates 14. As shown in FIG. 2, the inside portion 82 of the side members 80 comprise grooves 84 that receive a portion of the sides 17 of the plurality of bipolar electrode plates 14. The inside portion 82 of the side members 80 can also comprise recesses 86 that receive the guide members 18 of the cartridge assembly 12. For example, the inside portion 82 of the side members 80 can each independently comprise at least two recesses 86, such as at least three recesses 86, that receive and engage the guide members 18 of the cartridge assembly 12.

In such embodiments or aspects, it is appreciated that the housing 28 of the cell body 20 is designed to receive the cartridge assembly 12 with the side members 80. For instance, the inner surface 29 of the housing 28 can be shaped and designed to receive the shape and design of the outer portions 88 of the side members 80 of the cartridge assembly 12. It was found that the previously described side members 80 can help prevent electrical current from jumping between the edges of the bipolar electrode plates 14.

In certain non-limiting embodiments or aspects, referring to FIG. 1, a notch 32 is formed in a corner of each bipolar electrode plate 14. In some non-limiting embodiments or aspects, each bipolar electrode plate 14 includes at least two notches 32 and 34 formed on two different corners of each bipolar electrode plate 14. For example, and as shown in FIG. 1, a first notch 32 is formed in a corner of a first end 13 of each bipolar electrode plate 14 and a second notch 34 is formed in a corner of a second opposite end 15 of each bipolar electrode plate 14. Further, the first notch 32 is shaped different than the second notch 34. It is appreciated that additional notches 32 can also be used and which have different shapes and designs from the other notches 32.

When the plurality of bipolar electrode plates 14 include one or more notches 32 and/or 34, the housing 28 of the cell body 20 is configured to receive or engage the notches 32 and/or 34 of the bipolar electrode plates 14. For example, the housing 28 of the cell body 20 can comprise receiving members 36 such as protrusions, slots, or the like, that are configured to receive or engage the one or more notches 32 and/or 34. The one or more notches 32 and/or 34 and receiving members 36 are configured so that the plurality of bipolar electrode plates 14 can only be inserted into the housing 28 in one direction. Therefore, the one or more notches 32 and/or 34 and receiving members 36 prevent incorrect installation of the cartridge assembly 12 into the housing 28 of the cell body 20 such that the cartridge assembly 12 and cell body 20 can only be assembled in the correct manner.

As shown in FIG. 1, the cell body 20 also includes a first end 40 comprising an inlet 42 and a second end 44 comprising an outlet 46. The inlet 42 allows materials and, in particular, a liquid solution to enter the housing 28 of the cell body 20. After entering the housing 28 of the cell body 20, the liquid solution passes through the compartments formed by the plurality of bipolar electrode plates 14 of the cartridge assembly 12. The treated liquid solution then exits the cell body 20 through the outlet 46.

Referring to FIG. 1, the electrolytic cell 10 further includes a first terminal cap 50 that connects to the first side 22 of the cell body 20 and a second terminal cap 60 that connects to the second side 24 of the cell body 20. The terminal caps 50 and 60 enclose the cartridge assembly 12 within the housing 28 of the cell body 20. Further, the first terminal cap 50 comprises a cathode plate 52 and the second terminal cap 60 comprises an anode plate. The terminal caps 50 and 60 can be formed from various materials including, but not limited to, an acrylic material. During operation, current passes from the anode plate, across the liquid solution and the one or more bipolar electrode plates 14, and out to the cathode plate 52.

In certain non-limiting embodiments or aspects, and as shown in FIG. 1, the first terminal cap 50 and second terminal cap 60 can each independently comprise a recess 54 that is configured to receive the cathode plate 52 and anode plate, respectively. For example, the inner surface 56 of the first terminal cap 50 and the inner surface of the second terminal cap 60 can each independently be recessed to receive the cathode plate 52 and anode plate, respectively.

In some non-limiting embodiments or aspects, the cathode plate 52 comprises a notch 58 and the recess 54 of the first terminal cap 50 comprises a relief 55 that matches the shape and design of the notch 58. Similarly, the anode plate can comprise a notch that is different from the notch 58 of the cathode plate 52, and the recess of the second terminal cap 60 comprises a relief that matches the shape and design of the notch. Because the notches, such as notch 58, of the cathode plate 52 and the anode plate are different, the cathode plate 52 can only be placed in the first terminal cap 50 and the anode plate can only be placed in the second terminal cap 60. Therefore, the different notches of corresponding reliefs prevent the cathode plate 52 or anode plate from being placed into the incorrect terminal cap 50 or 60.

As shown in FIG. 1, the first and second terminal caps 50 and 60 each independently comprise orifices 70 positioned around a perimeter of each terminal cap 50 and 60. The orifices 70 are configured to receive fasteners, such as screws, to attach the terminal caps 50 and 60 to the cell body 20. As further shown in FIG. 1, the cell body 20 also includes orifices 21 to receive the fasteners positioned through the orifices 70 of each terminal cap 50 and 60.

In certain non-limiting embodiments or aspects, the orifices 70 of the first terminal cap 50 form a first pattern that align with orifices 21 formed in the first side 22 of the cell body 20, and the orifices 70 of the second terminal cap 60 form a second pattern that is different from the first pattern and which align with orifices 70 formed in the second side 24 of the cell body 20. By using different orifice 70 patterns in the first and second caps 50 and 60, each cap 50 and 60 can only be assembled onto a particular side 22 or 24 of the cell body 20.

In some non-limiting embodiments or aspects, the cell body 20 is formed from a transparent material, such as a transparent acrylic material, so that the bipolar electrode plates 14 of the cartridge assembly 12 can be viewed when positioned within the cell body 20. The terminal caps 50 and 60 can also be formed from a transparent material, such as a transparent acrylic material. As used herein, a "transparent material" refers to a material in which an object beyond the material is visible to the naked eye when viewed through the material.

It was found that the previously described electrolytic cell 10 allows for easy and efficient removal of the cartridge assembly 12 from the cell body 20 to replace or repair the bipolar electrode plates 14. Further, because the terminal caps 50 and 60 are attached directly to the cell body 20 without penetrating the cartridge assembly 12, the bipolar electrode plates 14 have a longer lifespan. The condition and lifespan of the bipolar electrode plates 14 are also improved by securing the cartridge assembly 12 within the housing 28 with the guide members 18 such that the bipolar electrode plates 14 do not contact the inner surfaces of the housing 28.

Figure 3:
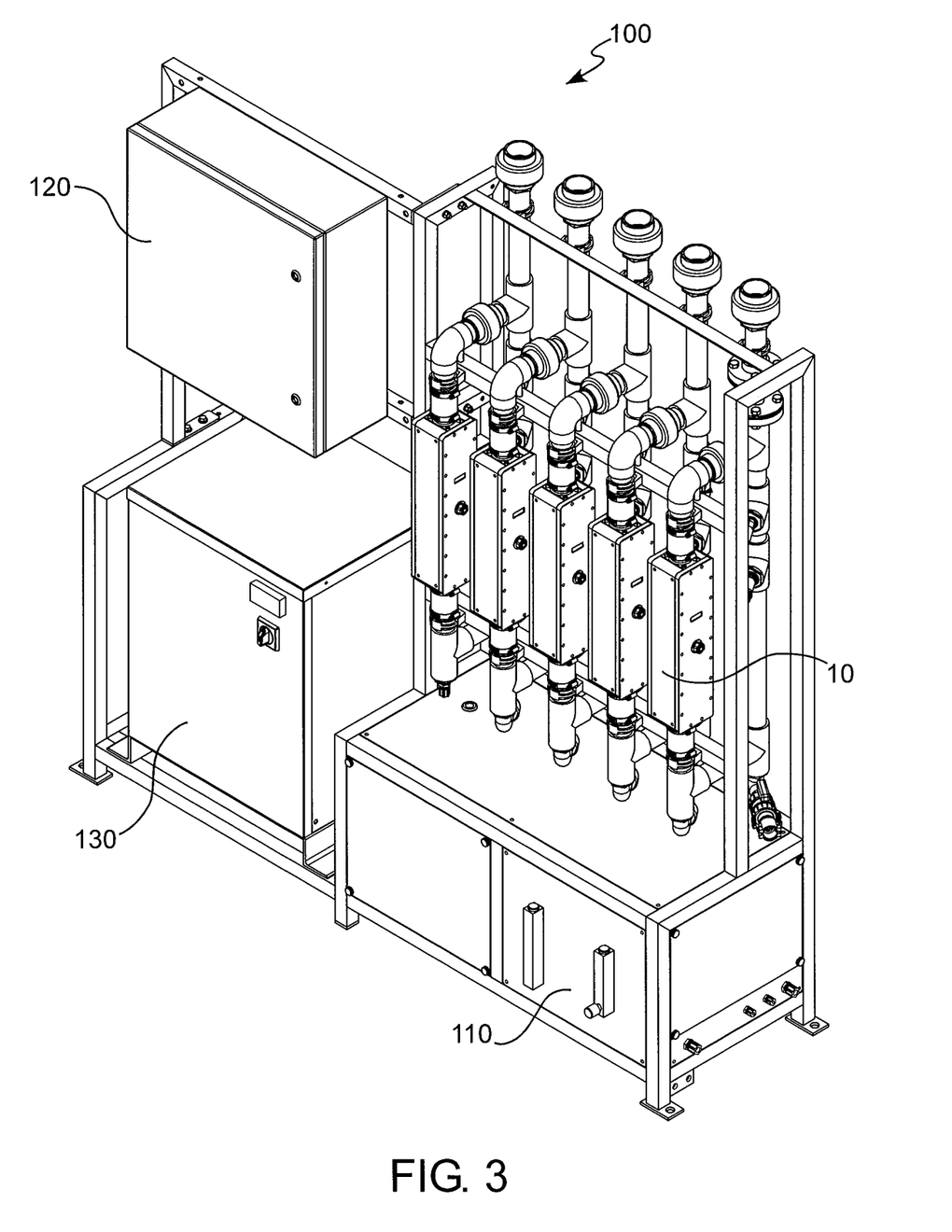
FIG. 3 is a perspective view of a system for treating water according to the present invention.
Figure 4:
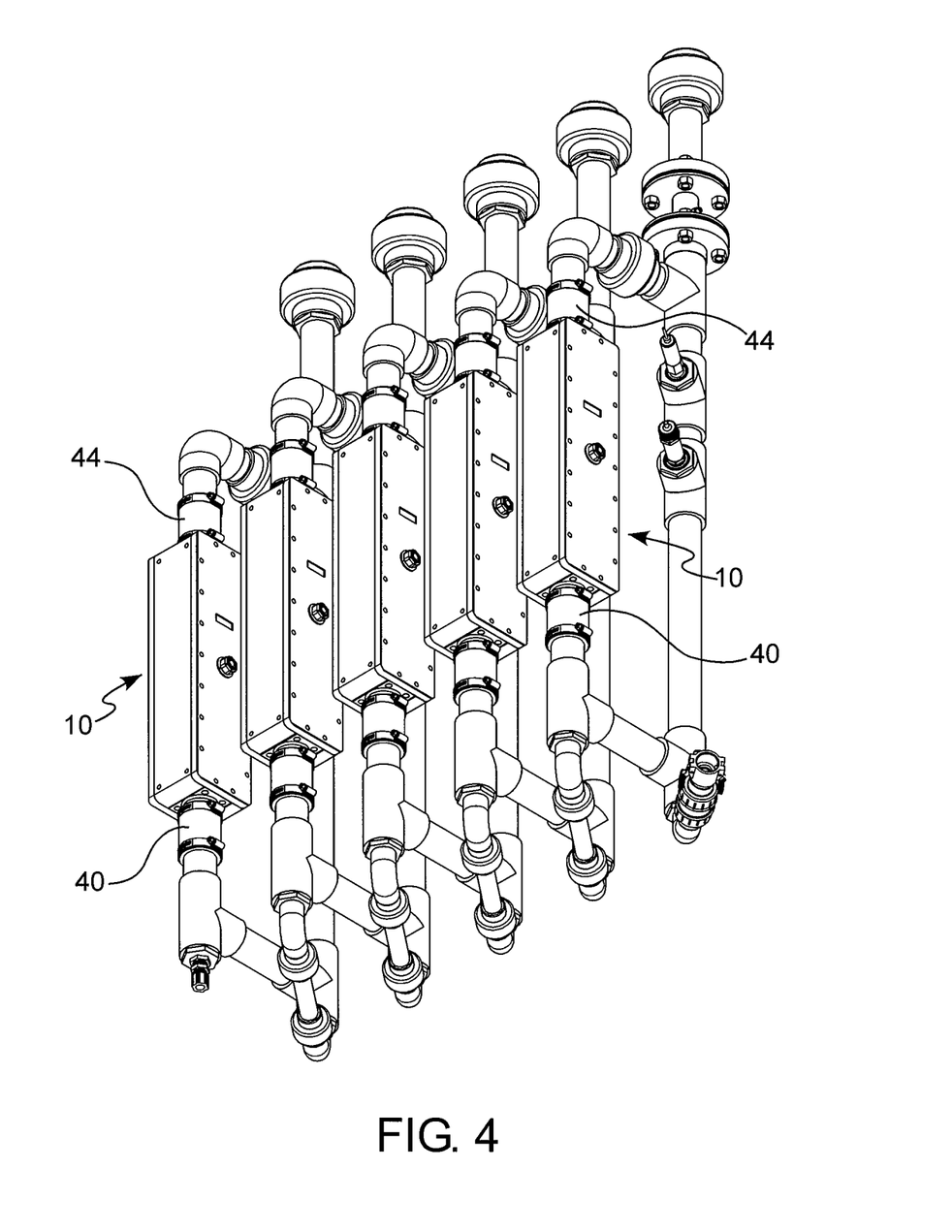
FIG. 4 is a perspective view of the array of electrolytic cells and connection system illustrated in FIG. 3.

Referring to FIG. 3, the present invention also relates to a water treatment system 100 that includes a base solution that can be stored in one or more vessels or containers 110 and which is in fluid communication with one or more of the previously described electrolytic cells 10. For example, and as shown in FIGS. 3 and 4, the water treatment system 100 can include an array or plurality of electrolytic cells 10 that are in fluid communication with each other and which is in fluid communication with a base solution contained in a vessel or container 110. The system 100 can also include various other components such as, for example, electrical device 130 that transfers electrical energy to electrolytic cells 10. A non-limiting example of such an electrical device 130 is an electrical transformer.

A non-limiting example of a suitable water treatment system and which can be modified to include the electrolytic cells 10 of the present invention is described in U.S. Pat. No. 7,897,022 at least in column 7, line 6 to column 11, line 41 and the corresponding figures, which is incorporated by reference herein.

In some non-limiting embodiments or aspects, the base solution comprises a salt dissolved in water to form a concentrated brine solution. The water may be processed with a water softener prior to treatment. The brine or base solution can be fed into the electrolytic cells 10 of the present invention. It is appreciated that the brine or base solution can be prepared and delivered into the electrolytic cells using various pumps, vessels, and transfers lines. Non-limiting examples of such devices that can be used with the system are described in U.S. Pat. No. 7,897,022 at least in column 7, line 6 to column 8, line 42 and the corresponding figures, which is incorporated by reference herein.

In accordance with the present invention, the previously described electrolytic cells 10 convert the brine or base solution into sodium hypochlorite solution and hydrogen using electrical power. In particular, the diluted brine solution is fed into the inlet 42 of the cell 10 and passes through the cartridge assembly 12. As the liquid solution passes through the electrolytic cell 10, current passes from the anode plate, across the liquid solution and the one or more bipolar electrode plates 14, and out to the cathode plate 52 such that hydrogen is liberated from the solution to form sodium hypochlorite.

In some non-limiting embodiments or aspects, the sodium hypochlorite and hydrogen produced by a first electrolytic cell 10 are both fed out of the cell outlet 46 and toward a junction. The junction is configured such that the density differentials between the sodium hypochlorite and the hydrogen passively separate into different dedicated bifurcated lines. The modified solution (containing a small percentage of sodium hypochlorite) is directed down the return line, while the hydrogen vents vertically out a second line to output. The return line reaches a second junction, wherein a portion of the modified solution is cycled back through the electrolytic cell 10, and another portion of the modified solution is directed through a smaller feed tube to the inlet 16 of the second electrolytic cell 10 of the series. The process is repeated until the solution has passed through all the electrolytic cells 10 and into an electrolytic cell 10 outlet line. After processing, the sodium hypochlorite can be transferred into a vessel or other containment means.

It is appreciated that the electrolytic cells 10 passively allow all produced hydrogen to be removed from each electrolytic cell 10 by the density differential created during the electrolytic process. In certain non-limiting embodiments or aspects, the electrolytic cells 10 are vertically aligned hydraulically in series. The vertical orientation and configuration of the electrolytic cells 10 allows for the instantaneous passive removal of hydrogen produced. The electrolytic cells 10 of the present invention are arranged to also provide a re-circulation of the solution which provides for many benefits including reduced scaling potential, lower resistance, lower heat gain, lower chlorate formation, and higher overall efficiencies.

In certain non-limiting embodiments or aspects, the system is automatically operated by a controller 120. It is appreciated that the controller 120 may include one or more microprocessors, CPUs, and/or other computing devices. One or more computer-readable storage mediums can be in operable communication with the controller. The computer-readable storage mediums can contain programming instructions that, when executed, cause the controller to perform multiple tasks.

The system of the present invention can include other components and processing parameters as well as delivering and dosing systems/devices. Non-limiting examples of such components and processes are described in U.S. Pat. No. 7,897,022 at least in column 7, line 6 to column 15, line 67 and the corresponding figures, which is incorporated by reference herein.

Whereas particular embodiments of this invention have been described above for purposes of illustration, it will be evident to those skilled in the art that numerous variations of the details of the present invention may be made without departing from the invention as defined in the appended claims.

The invention claimed is:

1. An electrolytic cell comprising:
 a cartridge assembly comprising: a plurality of bipolar electrode plates spaced apart and guide members formed on both sides of the plurality of bipolar electrode plates that contact peripheral edges of the bipolar electrode plates, and side members that attach to the sides of the plurality of bipolar electrode plates;
 a cell body comprising: a first side; a second side opposite the first side; an opening that extends through the first and second sides to form a housing that receives the cartridge assembly; a first end comprising an inlet that allows liquid to enter the housing of the cell body and a second end comprising an outlet that allows liquid to exit the housing of the cell body;
 a first terminal cap that connects to the first side of the cell body and which comprises a cathode plate; and
 a second terminal cap that connects to the second side of the cell body and which comprises an anode plate,
 wherein the first and second terminal caps close the opening of the cell body and enclose the cartridge assembly within the housing of the cell body, and
 wherein the side members comprise grooves that receive a portion of the sides of the plurality of bipolar electrode plates, and wherein inside portions of the side members each independently comprise at least two recesses that receive and engage the guide members.

2. The electrolytic cell of claim 1, wherein the guide members are spaced apart, and wherein each guide member independently extends in a direction perpendicular to a longitudinal axis of the bipolar electrode plates.

3. The electrolytic cell of claim 1, wherein the guide members are formed from polytetrafluoroethylene.

4. The electrolytic cell of claim 1, wherein a notch is formed in a corner of each bipolar electrode plate, and wherein the housing of the cell body is configured to receive the notches of the bipolar electrode plates and prevent incorrect installation of the cartridge assembly into the housing of the cell body.

5. The electrolytic cell of claim 1, wherein a first notch is formed in a corner of a first end of each bipolar electrode plate and a second notch is formed in a corner of a second opposite end of each bipolar electrode plate, and wherein the housing of the cell body is configured to receive the first and second notches of the bipolar electrode plates and prevent incorrect installation of the cartridge assembly into the housing of the cell body.

6. The electrolytic cell of claim 1, wherein an inner surface of the first terminal cap comprises a recess that is configured to receive the cathode plate and an inner surface of the second terminal cap comprises a recess that is configured to receive the anode plate.

7. The electrolytic cell of claim 6, wherein the cathode plate comprises a notched corner and the recess of the first terminal cap is configured to receive the notched corner of the cathode plate.

8. The electrolytic cell of claim 5, wherein the anode plate comprises a notched corner that is different from the notched corner of the cathode plate and the recess of the second terminal cap is configured to receive the notched corner of the anode plate.

9. The electrolytic cell of claim 1, wherein the first and second terminal caps each independently comprise orifices positioned around a perimeter of each cap and which are configured to receive fasteners to attach the caps to the cell body.

10. The electrolytic cell of claim 9, wherein the orifices of the first terminal cap form a first pattern that align with orifices formed in the first side of the cell body, and the orifices of the second terminal cap form a second pattern that is different from the first pattern and which align with orifices formed in the second side of the cell body.

11. The electrolytic cell of claim 1, wherein the cell body is formed from a transparent material to allow the bipolar electrode plates of the cartridge assembly to be viewed through the cell body.

12. An electrolytic cell comprising:
a cartridge assembly comprising: a plurality of bipolar electrode plates spaced apart and guide members formed on both sides of the plurality of bipolar electrode plates;
a cell body comprising: a first side; a second side opposite the first side; an opening that extends through the first and second sides to form a housing that receives the cartridge assembly; a first end comprising an inlet that allows liquid to enter the housing of the cell body and a second end comprising an outlet that allows liquid to exit the housing of the cell body;
a first terminal cap that connects to the first side of the cell body and which comprises a cathode plate; and
a second terminal cap that connects to the second side of the cell body and which comprises an anode plate,
wherein the first and second terminal caps close the opening of the cell body and enclose the cartridge assembly within the housing of the cell body, and
wherein an inner surface of the housing of the cell body comprises recesses that are shaped to receive the guide members of the cartridge assembly.

13. A system for treating water comprising:
a) a plurality of electrolytic cells in fluid communication with each other, wherein the plurality of electrolytic cells comprises at least one electrolytic cell according to claim 1 or claim 12;
b) a vessel or container comprising a base solution in fluid communication with at least one of the electrolytic cells.

14. The system of claim 13, wherein hydrogen is liberated from the base solution to form sodium hypochlorite after the base solution is passed through the electrolytic cells.

15. The system of claim 13, wherein the guide members are spaced apart, and wherein each guide member independently extends in a direction perpendicular to a longitudinal axis of the bipolar electrode plates.

16. The system of claim 13, wherein a notch is formed in a corner of each bipolar electrode plate, and wherein the housing of the cell body is configured to receive the notches of the bipolar electrode plates and prevent incorrect installation of the cartridge assembly into the housing of the cell body.

17. The system of claim 13, wherein a first notch is formed in a corner of a first end of each bipolar electrode plate and a second notch is formed in a corner of a second opposite end of each bipolar electrode plate, and wherein the housing of the cell body is configured to receive the first and second notches of the bipolar electrode plates and prevent incorrect installation of the cartridge assembly into the housing of the cell body.

18. The system of claim 13, wherein an inner surface of the first terminal cap comprises a recess that is configured to receive the cathode plate and an inner surface of the second terminal cap comprises a recess that is configured to receive the anode plate.

19. A method of liberating hydrogen from a base solution comprising:
a) directing a base solution into an electrolytic cell according to claim 1 or claim 12;
b) passing the base solution through the plurality of bipolar electrode plates;
c) supplying current to the cathode and anode plates, and charging the bipolar electrode plates as the base solution passes through the bipolar electrode plates; and
d) liberating hydrogen from the base solution.

* * * * *

UNITED STATES PATENT AND TRADEMARK OFFICE
CERTIFICATE OF CORRECTION

PATENT NO. : 10,975,479 B2  
APPLICATION NO. : 16/295778  
DATED : April 13, 2021  
INVENTOR(S) : Billie Fritz et al.

Page 1 of 1

It is certified that error appears in the above-identified patent and that said Letters Patent is hereby corrected as shown below:

On the Title Page

Column 2, Other Publications, Line 5, delete "htmlrl" and insert -- html --

In the Claims

Column 11, Line 15, Claim 8, delete "claim 5," and insert -- claim 7, --

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*